United States Patent
Kim et al.

(10) Patent No.: US 11,258,321 B2
(45) Date of Patent: Feb. 22, 2022

(54) MOTOR HAVING ROTOR FRAME WITH MAGNET FIXING JIG HOLES

(71) Applicant: LG Electronics Inc., Seoul (KR)

(72) Inventors: Jaeho Kim, Seoul (KR); Minsoo La, Seoul (KR); Hyuk Nam, Seoul (KR); Kyungmo Yu, Seoul (KR); Sangyoung Cho, Seoul (KR); Kyungho Ha, Seoul (KR); Pangeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 16/696,393

(22) Filed: Nov. 26, 2019

(65) Prior Publication Data

US 2020/0169133 A1    May 28, 2020

(30) Foreign Application Priority Data

Nov. 26, 2018 (KR) .................. 10-2018-0147665
Nov. 26, 2018 (KR) .................. 10-2018-0147666
(Continued)

(51) Int. Cl.
*H02K 1/27* (2006.01)
*H02K 1/30* (2006.01)
(Continued)

(52) U.S. Cl.
CPC .............. *H02K 1/30* (2013.01); *H02K 1/276* (2013.01); *H02K 1/2766* (2013.01);
(Continued)

(58) Field of Classification Search
CPC .... H02K 1/276; H02K 1/2766; H02K 1/2786; H02K 1/30; H02K 15/03; H02K 15/12; H02K 15/125; H02K 21/22
(Continued)

(56) References Cited

U.S. PATENT DOCUMENTS 4,012,651 A   3/1977  Burson
4,339,874 A   7/1982  Mc'Carty et al.
(Continued)

FOREIGN PATENT DOCUMENTS

CN      1845427      10/2006
CN    101675188       3/2010
(Continued)

OTHER PUBLICATIONS

Jeong, Machine Translation of KR20130090165, Aug. 2013 (Year: 2013).*

(Continued)

*Primary Examiner* — Quyen P Leung
*Assistant Examiner* — Eric Johnson
(74) *Attorney, Agent, or Firm* — Fish & Richardson P.C.

(57) ABSTRACT

A motor includes a stator and a rotor rotatably coupled to a rotation shaft. The rotor includes: rotor core segments arranged along a circumferential direction of the rotor on the inner side or the outer side of the stator and spaced apart from one another to define permanent magnet arrangement slots between the rotor core segments; permanent magnets inserted into the permanent magnet arrangement slots, respectively; and a rotor frame including rotor frame pins that fix each of the permanent magnets between the rotor core segments. Each of the rotor core segments defines a rotor core hole that extends parallel to an axial direction of the rotation shaft. The rotor frame comprises: a base formed to surround the plurality of rotor core segments and the plurality of permanent magnets in a direction parallel to an axial direction of the rotation shaft; and a plurality of permanent magnet fixing jig holes formed only at an inner end between the inner and outer ends of the base to expose the plurality of permanent magnets.

14 Claims, 9 Drawing Sheets

(30) Foreign Application Priority Data

Nov. 26, 2018 (KR) ........................ 10-2018-0147667
Nov. 26, 2018 (KR) ........................ 10-2018-0147669

(51) Int. Cl.
*H02K 21/22* (2006.01)
*H02K 1/2786* (2022.01)
*H02K 1/276* (2022.01)
*H02K 21/16* (2006.01)

(52) U.S. Cl.
CPC ........... *H02K 1/2786* (2013.01); *H02K 21/22* (2013.01); *H02K 21/16* (2013.01)

(58) Field of Classification Search
USPC ........................................ 310/43, 45, 156.56
See application file for complete search history.

(56) References Cited

U.S. PATENT DOCUMENTS

| | | | |
|---|---|---|---|
| 5,786,650 | A | 7/1998 | Uchida et al. |
| 6,384,504 | B1 | 5/2002 | Ehrhart et al. |
| 9,590,459 | B2 | 3/2017 | Hoemann |
| 2003/0193254 | A1 | 10/2003 | Morimatsu |
| 2006/0091754 | A1 | 5/2006 | Kim et al. |
| 2010/0050702 | A1 | 3/2010 | Kim et al. |
| 2011/0175479 | A1 | 7/2011 | Marchitto |
| 2011/0187210 | A1 | 8/2011 | Marchitto |
| 2012/0043844 | A1 | 2/2012 | Bailey et al. |
| 2012/0286520 | A1 | 11/2012 | Booth |
| 2013/0061641 | A1 | 3/2013 | Yoon et al. |
| 2013/0119808 | A1* | 5/2013 | Hirokawa ............ H02K 1/2773 310/156.43 |
| 2014/0070653 | A1 | 3/2014 | Lee et al. |
| 2014/0097718 | A1* | 4/2014 | Yukinori ................ H02K 21/16 310/156.08 |
| 2014/0102151 | A1* | 4/2014 | Yoon ........................ D06F 37/20 68/140 |
| 2014/0152135 | A1 | 6/2014 | Jang et al. |
| 2014/0375162 | A1 | 12/2014 | Kim et al. |
| 2015/0076933 | A1 | 3/2015 | Hoemann et al. |
| 2015/0380998 | A1* | 12/2015 | Hoemann ................ H02K 1/30 310/156.12 |
| 2016/0156233 | A1* | 6/2016 | Yoon .................... H02K 1/2786 310/43 |
| 2017/0070107 | A1* | 3/2017 | Lee ........................... H02K 1/30 |
| 2017/0170694 | A1 | 6/2017 | Bhargava et al. |
| 2018/0069443 | A1 | 3/2018 | Han et al. |
| 2019/0207446 | A1 | 7/2019 | Swales et al. |

FOREIGN PATENT DOCUMENTS

| | | |
|---|---|---|
| CN | 102035281 | 4/2011 |
| CN | 102163900 | 8/2011 |
| CN | 102738924 | 10/2012 |
| CN | 103053096 | 4/2013 |
| CN | 104285363 | 1/2015 |
| CN | 104393730 | 3/2015 |
| CN | 105474514 | 4/2016 |
| CN | 107733111 | 2/2018 |
| CN | 107735924 | 2/2018 |
| DE | 909472 | 4/1954 |
| EP | 0669699 | 8/1995 |
| EP | 2824800 | 1/2015 |
| EP | 2942858 | 11/2015 |
| EP | 3349332 | 7/2018 |
| JP | H07264793 | 10/1995 |
| JP | 2001095185 | 4/2001 |
| JP | 2003510998 | 3/2003 |
| JP | 2005261177 | 9/2005 |
| JP | 2012217269 | 11/2012 |
| JP | 2012217269 A * | 11/2012 |
| JP | 2015080336 | 4/2015 |
| KR | 20120110275 | 10/2012 |
| KR | 20130090165 A * | 8/2013 |
| KR | 20160112412 | 9/2016 |
| KR | 20170030022 | 3/2017 |
| KR | 20180020030 | 2/2018 |
| WO | WO2015009031 | 1/2015 |

OTHER PUBLICATIONS

Sakamoto, Machine Translation of JP2015217269, Nov. 2012 (Year: 2012).*
Extended European Search Report in European Application No. 19210107.9, dated Apr. 15, 2020, 8 pages.
Extended European Search Report in European Application No. 19210106.1, dated Apr. 14, 2020, 9 pages.
EP Office Action in European Appln. No. 19210107.9, dated Feb. 19, 2021, 7 pages.
Extended European Search Report in European Application No. 19210105.3, dated Apr. 7, 2020, 16 pages.
Extended European Search Report in European Application No. 19210101.2, dated Apr. 2, 2020, 13 pages.
Fofanov et al., "Magnetic properties stainless steel," Stahl, dated Jan. 1, 2013, 24 pages, XP055561965 (with English translation).
Non-Final Office Action in U.S. Appl. No. 16/696,505, dated Jul. 16, 2021, 36 pages.
Office Action in Chinese Appln. No. 201911175236.8, dated Sep. 23, 2021, 23 pages (with English translation).
Office Action in Chinese Appln. No. 201911174705.4, dated Sep. 30, 2021, 16 pages (with English translation).
Office Action in Chinese Appln. No. 201911175262.0, dated Sep. 23, 2021, 15 pages (with English translation).
Office Action in Chinese Appln. No. 201911176293.8, dated Sep. 23, 2021, 17 pages (with English translation).
Office Action in U.S. Appl. No. 16/696,117, dated Nov. 26, 2021, 27 pages.
Office Action in U.S. Appl. No. 16/696,311, dated Nov. 26, 2021, 30 pages.

* cited by examiner

MOTOR HAVING ROTOR FRAME WITH MAGNET FIXING JIG HOLES

CROSS-REFERENCE TO RELATED APPLICATIONS

Pursuant to 35 U.S.C. § 119(a), this application claims the benefit of the earlier filing date and the right of priority to Korean Applications No. 10-2018-0147665, filed on Nov. 26, 2018, No. 10-2018-0147666, filed on Nov. 26, 2018, No. 10-2018-0147667, filed on Nov. 26, 2018 and No. 10-2018-0147669, filed on Nov. 26, 2018, the contents of which are incorporated by reference herein in their entirety.

TECHNICAL FIELD

The present disclosure relates to a motor.

BACKGROUND

A motor is a device that can provide a rotational force generated by electromagnetic interaction between a stator and a rotor to a rotation shaft. A coil may be wound on the stator to generate a rotational force, and the rotor may rotate when a current is applied to the coil. The motor may be used in various fields such as a washing machine, a refrigerator, a compressor, and a cleaner. For example, the motor may be connected to a drum of the washing machine by a rotation shaft to implement the rotation of the drum.

In some examples, permanent magnet type motors may be classified into surface mounted magnet types and interior permanent magnet types according to the attachment type of a permanent magnet. The surface mounted magnet type denotes a form in which a permanent magnet is attached to a surface of a rotor core. The interior permanent magnet type denotes a form in which a permanent magnet embedded in the rotor core. The interior permanent magnet types may include a spoke type in which the rotor core and the permanent magnet stand along a height direction parallel to an axial direction of the rotation shaft.

A spoke type motor may have an advantage in improving the efficiency and performance of the rotor through a magnetic flux concentration effect using the rotor core. In some cases, when a rotational speed of the rotation shaft generated by the spoke type motor is excessively fast, there is a concern that the structural strength of the rotor is lowered. For example, during a spin-drying operation, the rotation shaft of the motor installed in a washing machine may rotate at a higher speed than the other operations, and the rotation speed may exceed 1,200 rpm.

In some cases, when the rotation shaft of the motor excessively rotates, a strong centrifugal force may act on the rotor of the motor. Furthermore, this strong centrifugal force may cause breakage in which the permanent magnet or rotor core in the rotor is separated in a radial direction of the rotor. In some examples, to mitigate such breakage, a motor may include a first fastening member disposed above and below a permanent magnet, and a second fastening member disposed to pass through the rotor core.

In some examples, when the rotation shaft of the motor rotates at a slow speed, the structure may prevent the permanent magnet and the rotor core from being disengaged using the two fastening members and the rotor housing. In some cases, the first fastening member, the second fastening member, and the rotor housing may be formed with individual parts, and thus when the rotation shaft of the motor rotates at a very high speed, the possibility of breakage occurrence may be very high due to an insufficient physical coupling force between each part.

In some cases, the first fastening members are disposed above and below the permanent magnet and the rotor core, respectively, which may increase the motor size.

In some cases, the rotor housing, the rotor core, the permanent magnet, the first fastening member, and the second fastening member may be sequentially assembled in a predetermined order. In this respect, the productivity may be low, particularly as the number of the fastening members increases, which is disadvantageous to mass production.

In some cases, holes may be formed in the rotor core to couple a plurality of fastening members. An excessive increase in the number of the holes may cause the performance degradation of the rotor core that provides a path of magnetic flux.

SUMMARY

The present disclosure describes a motor having a structure capable of preventing the core and the permanent magnet from being broken in a radial direction. In particular, the present disclosure describes a structure capable of improving the structural strength of a motor without causing performance degradation or size increase of the motor.

The present disclosure further describes examples of an optimal shape, an optimal size, and various optimal ratios of the rotor core segment and the permanent magnet which may not cause performance degradation of the rotor while improving the structural strength of the rotor.

The present disclosure further describes a configuration capable of stably installing the rotor core segment and the permanent magnet in place, and securely maintaining the coupling state thereof.

According to one aspect of the subject matter described in this application, a motor includes a stator and a rotor rotatably coupled to a rotation shaft and disposed at an inner side of the stator or an outer side of the stator. The rotor includes: a plurality of rotor core segments arranged along a circumferential direction of the rotor on the inner side or the outer side of the stator and spaced apart from one another to define a plurality of permanent magnet arrangement slots between the plurality of rotor core segments, where each of the plurality of rotor core segments defines a rotor core hole that extends parallel to an axial direction of the rotation shaft; a plurality of permanent magnets inserted into the plurality of permanent magnet arrangement slots, respectively, where the plurality of rotor core segments and the plurality of permanent magnets are alternately arranged along the circumferential direction of the rotor; and a rotor frame including a plurality of rotor frame pins that fix each of the plurality of permanent magnets between the plurality of rotor core segments, each of the plurality of rotor frame pins being inserted into the rotor core hole, where the rotor frame comprises: a base formed to surround the plurality of rotor core segments and the plurality of permanent magnets in a direction parallel to an axial direction of the rotation shaft; and a plurality of permanent magnet fixing jig holes formed only at an inner end between the inner and outer ends of the base to expose the plurality of permanent magnets.

In some implementations a ratio of a diameter of the rotor core hole with respect to a linear distance between both side surfaces of each of the plurality of rotor core segments is 0.4 to 0.7.

Implementations according to this aspect may include one or more of the following features. For example, each of the plurality of rotor core segments may include: a body that defines the rotor core hole; a head that protrudes from an inner end of the body to both sides along the circumferential direction of the rotor; and core protrusions that protrude radially outward from an outer end of the body and that are spaced apart from each other in the circumferential direction of the rotor to thereby define a rotor core slot between the core protrusions. The rotor core hole is defined between the inner end of the body and the rotor core slot in a radial direction of the rotor.

In some implementations, a linear distance between the rotor core hole and the rotor core slot may be greater than or equal to 0.45 mm in the radial direction of the rotor. In some examples, each of the plurality of rotor core segments may include a plurality of electrical sheets that are stacked, and each of the plurality of electrical sheets may include a mating part that is disposed around the rotor core hole, that protrudes from a first surface of one of the electric sheets, and that is recessed from a second surface of the one of the electric sheets. A linear distance between the rotor core hole and the mating part may be greater than or equal to 0.45 mm.

In some implementations, a linear distance between both side surfaces of the body increases toward an outer side of one of the plurality of rotor core segments, and a linear distance between both side surfaces of the core protrusions increases toward the outer side of the one of the plurality of rotor core segments, where a rate of increase of the linear distance between the both side surfaces of the core protrusions is greater than a rate of increase of the linear distance between the both side surfaces of the body.

In some implementations, each of the plurality of permanent magnets may include: a first working surface that faces one of the plurality of rotor core segments in the circumferential direction of the rotor; and a second working surface that faces the one of the plurality of rotor core segments, that extends from the first working surface, and that defines an obtuse angle at a boundary between the first working surface and second working surface. The body of the one of the plurality of rotor core segments may include a first side surface that is in surface contact with the first working surface, and each of the core protrusions of the one of the plurality of rotor core segments may include a second side surface that extends from the first side surface of the body, that is in surface contact with the second working surface, and that defines an obtuse angle at a boundary between the first side surface and the second side surface.

In some examples, the obtuse angle defined at the boundary between the first side surface and the second side surface is 190 to 230 degrees.

In some implementations, a radial length of the second working surface in the radial direction of the rotor is defined by a difference between a radial length of one of the plurality of permanent magnets and a radial length of the first working surface, where a ratio of the radial length of the second working surface with respect to the radial length of the one of the plurality of permanent magnets is 0.15 to 0.35.

In some implementations, each of the plurality of rotor core segments has a first end and a second end positioned opposite to each other in the axial direction of the rotation shaft, and each of the plurality of permanent magnets has a first end and a second end positioned opposite to each other in the axial direction of the rotation shaft.

In some examples, the rotor frame may include: a first end base that surrounds the first ends of the plurality of rotor core segments and the first ends of the plurality of permanent magnets; and a second end base that surrounds the second ends of the plurality of rotor core segments and the second ends of the plurality of permanent magnets, where a length of each of the plurality of rotor frame pins in the axial direction of the rotation shaft is less than a distance between the first end base and the second end base.

In some implementations, each of the plurality of rotor core segments has a first end and a second end positioned opposite to each other in the axial direction of the rotation shaft, and each of the plurality of permanent magnets has a first end and a second end positioned opposite to each other in the axial direction of the rotation shaft. In the same implementations, the rotor frame may include: a first end base that surrounds the first ends of the plurality of rotor core segments and the first ends of the plurality of permanent magnets; and a second end base that surrounds the second ends of the plurality of rotor core segments and the second ends of the plurality of permanent magnets, where one of the first end base or the second end base defines a plurality of permanent magnet fixing jig holes at an inner end of the one of the first end base or the second end base, and the plurality of permanent magnet fixing jig holes expose the plurality of permanent magnets to an outside of the rotor frame.

In some examples, the plurality of permanent magnet fixing jig holes are formed only at an inner end between the inner and outer ends of the first end base or the second end base.

In some examples, the rotor frame has a plurality of inner pillars extended in a direction parallel to an axial direction of the rotation shaft to connect an inner end of the first end base and an inner end of the second end base to each other, and the plurality of permanent magnet fixing jig holes are formed for each boundary between the first end base and the plurality of inner pillars or formed for each boundary between the second end base and the plurality of inner pillars.

In some examples, the plurality of permanent magnet fixing jig holes are spaced from one another and arranged along a circumferential direction of the rotor frame.

In some implementations, the rotor frame may include: a first end base that surrounds the first ends of the plurality of rotor core segments and the first ends of the plurality of permanent magnets; and a second end base that surrounds the second ends of the plurality of rotor core segments and the second ends of the plurality of permanent magnets, where one of the first end base or the second end base defines a plurality of rotor frame holes, each of the plurality of rotor frame holes facing one of the plurality of rotor frame pins in the axial direction of the rotation shaft.

In some implementations, each of the plurality of permanent magnets may include: an inner surface that faces the stator; and an outer surface that faces an opposite side of the inner surface, where a ratio of a width of the outer surface in the circumferential direction of the rotor with respect to a width of the inner surface in the circumferential direction of the rotor is 0.6 to 0.8.

In some implementations, the linear distance between the both side surfaces of each of the plurality of rotor core segments increases toward an outer end of the corresponding rotor core segment, where the both side surfaces of each of the plurality of rotor core segments have shapes symmetrical to each other with respect to a radial direction of the rotor.

In some implementations, the linear distance between the both side surfaces of each of the plurality of rotor core segments increases toward an outer end of the corresponding rotor core segment, and one of the both side surfaces of each of the plurality of rotor core segments extends parallel to a radial direction of the rotor, where the other one of the both side surfaces of each of the plurality of rotor core segments is inclined with respect to the radial direction of the rotor.

In some implementations, each of the plurality of permanent magnets has: a first working surface that faces a first side in the circumferential direction, the first working surface having a concave shape; and a second working surface that faces a second side opposite to the first side, where the second working surface has a convex shape. Each of the plurality of rotor core segments may include: a first side surface that is in surface contact with the first working surface of a first permanent magnet of the plurality of permanent magnets, where the first side surface has a convex shape corresponding to the concave shape of the first permanent magnet; and a second side surface that is in surface contact with the second working surface of a second permanent magnet of the plurality of permanent magnets, where the second side surface has a concave shape corresponding to the convex shape of the second permanent magnet.

In some implementations, the convex shape of the second working surface may define an acute angle between a tangential plane of the second working surface and an inner end surface of the second permanent magnet facing the second working surface. In some examples, each of the plurality of rotor core segments may include: a body that defines the rotor core hole, the body having the first side surface and the second side surface; and a head that protrudes from an inner end of the body to both sides along the circumferential direction of the rotor, where the head has a curved shape and extends toward inner end surfaces of adjacent permanent magnets among the plurality of permanent magnets.

In some implementations, each of the plurality of rotor core segments may include: a body that defines the rotor core hole; a head that protrudes from an inner end of the body to both sides along the circumferential direction of the rotor; and a core protrusion that protrudes from an outer end of the body to both sides along the circumferential direction of the rotor. In some examples, the head may be disposed radially inward of an inner end of each of the plurality of permanent magnets.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Figure 1:
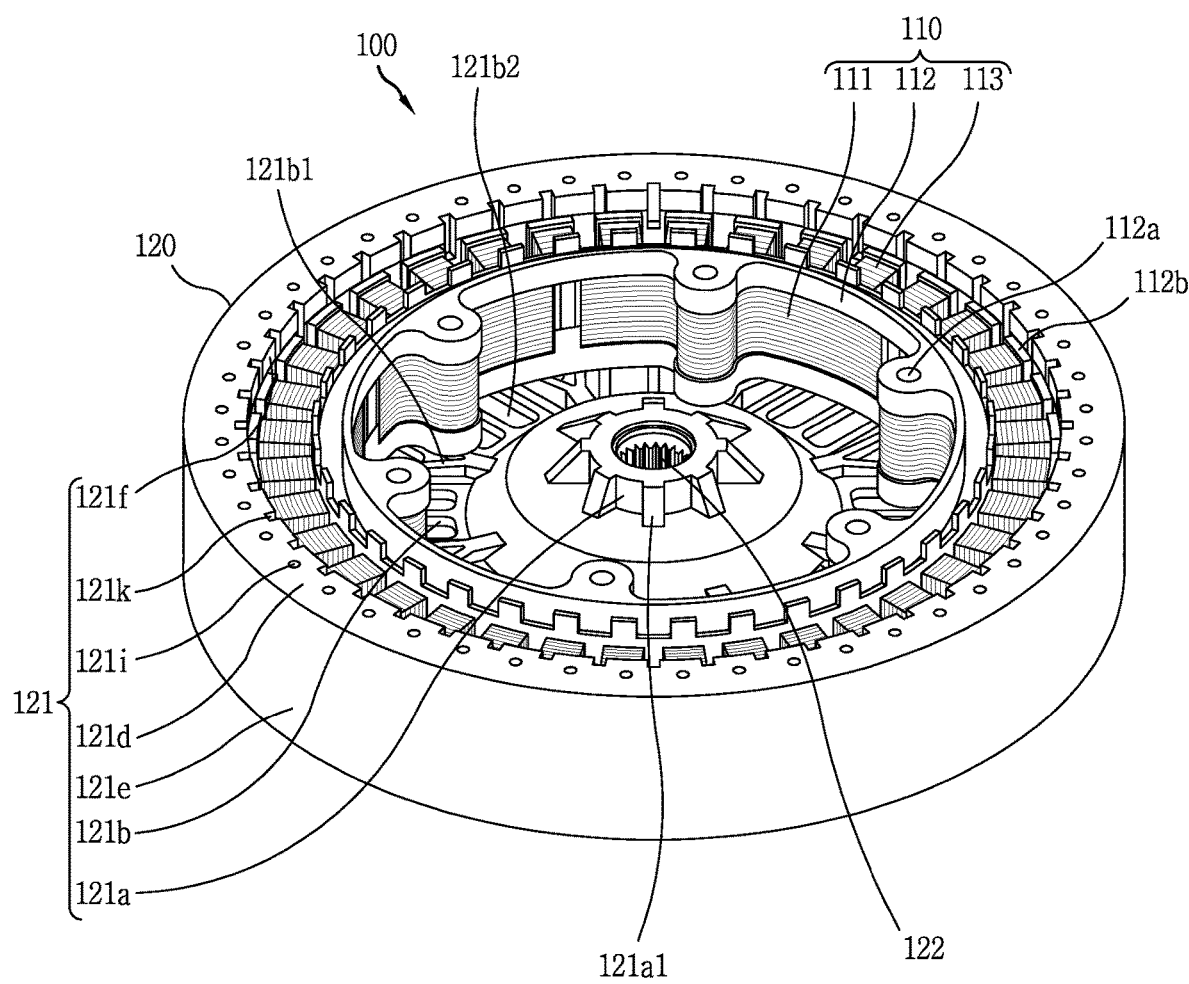
FIG. 1 is a perspective view showing an example motor.

Hereinafter, a motor will be described in more detail with reference to the accompanying drawings.

The same or similar reference numerals may be designated to the same or similar configurations, and the description thereof will be substituted by the earlier description.

FIG. 1 is a perspective view showing an example of a motor 100. The motor 100 may include a stator 110 and a rotor 120. The stator 110 may include a stator core 111, an insulator 112, and a coil 113.

In some implementations, the stator core 111 may be formed by stacking a plurality of electrical steel sheets (magnetic bodies) along an axial direction of a rotation shaft coupled to the motor 100. The stator core 111 may surround the rotation shaft at a position spaced apart from the rotation shaft.

In some implementations, the insulator 112 may be coupled to the stator core 111 at one side and the other side (e.g., upper and lower sides) along a direction parallel to an axial direction of the rotation shaft (in a vertical direction in FIG. 1). The insulator 112 may be made of an electrically insulating material. The insulator 112 may have a stator fixing portion 112a and a teeth insulation portion 112b.

The stator fixing portion 112a may protrude from a circumference of the insulator 112 toward the rotation shaft. The plurality of stator fixing portions 112a are formed. The plurality of stator fixing portions 112a may be disposed at positions spaced apart from each other along the circumference of the insulator 112. The stator fixing portion 112a may define a fastening member fixing hole to be open toward a direction parallel to an axial direction of the rotation shaft. The position of the stator 110 is fixed as the fastening member is coupled to the fastening member fixing hole.

The teeth insulation portion 112b may protrude radially from the circumference of the insulator 112. The teeth insulation portion 112b insulates the coil 113 from teeth connected to a yoke by surrounding the teeth surrounded by the coil 113.

The coil 113 is wound on each teeth insulation portion 112b. FIG. 1 illustrates a concentrated winding. A current is applied to the coil 113. The motor 100 is operated by the current applied to the coil 113.

The rotor 120 is rotatably disposed on an inner or outer side of the stator 110. The inner and outer sides are determined whether it faces toward the rotation shaft disposed at the center in a radial direction of the rotor 120 or faces toward an opposite direction thereof. The direction toward the rotation shaft is an inner side, and the direction away from the rotation shaft is an outer side. In FIG. 1, the rotor 120 shows an outer rotor 120 disposed on an outer side of the stator 110.

The rotor 120 includes a rotor frame 121. The rotor frame 121 may also be referred to as a rotor housing. The rotor frame 121 may surround the stator 110.

The rotor frame 121 includes a bushing coupling portion 121a, a spoke 121b, and an outer wall 121e.

The bushing coupling portion 121a may engage with a rotation shaft passing through a region surrounded by the stator 110. The bushing coupling portion 121a may be located at the center of the rotor frame 121 in a radial direction of the rotor 120. The center of the rotor frame 121 corresponds to a position facing the region surrounded by the stator 110.

The bushing coupling portion 122a may engage with the bushing 122. The bushing 122 refers to a part connected to the rotation shaft. One end of the rotation shaft may be coupled to the bushing 122, and the other end may be directly connected to an object to be supplied with a rotational force of the motor 100, such as a drum of the washing machine.

The bushing 122 may have a shape similar to a hollow cylinder. The bushing 122 has threads (e.g., coupling portion 122a) on an inner circumferential surface of the hollow so as to engage with the rotation shaft. The rotation shaft is inserted directly into the bushing 122. The rotation shaft and the rotor frame 121 are coupled to each other through the bushing 122.

A reinforcing rib 122a1 is formed around the bushing coupling portion 122a. A plurality of reinforcing ribs 122a1 are formed around the bushing coupling portion 122a, and a plurality of reinforcing ribs 122a1 are protruded from a boundary between the bushing coupling portion 122a and the spokes 122b along a direction inclined to the rotation shaft.

The spokes 121b may extend in a radial direction from the bushing coupling portion 121a or extends toward a direction inclined at an acute angle with respect to the radial direction. A plurality of spokes 121b are provided therein, and may be arranged around the bushing coupling portion 121a so as to face different directions. The spokes 121b may be disposed at positions covering one side or the other side of the stator 110 in a direction parallel to an axial direction of the rotation shaft. With reference to FIG. 1, a lower side of the stator 110 corresponds to the one side, and an upper side of the stator 110 corresponds to the other side. In this case, the spoke 121b may be located at a position covering a lower side of the stator 110 from below.

When a plurality of spokes 122b are formed in a radial direction around the bushing coupling portion 122a, a heat dissipation hole 122b1 may be located to between the plurality of spokes 122b. Heat generated from the motor due to the operation of the motor may be discharged through the heat dissipation hole 122b1.

The outer wall 121e may surround the stator 110 in a radial direction of the rotor 120. A plurality of rotor cores (or rotor core blocks, or rotor core segments) 123 and a plurality of permanent magnets 124 to be described later are installed on an inner side of the outer wall 121e.

FIG. 1 illustrates a spoke type motor 100 including a spoke 121b and the outer rotor 120, but the present disclosure is not limited to the spoke type motor 100 including the spoke 121b and the outer rotor 120. For instance, the present disclosure may be applicable to an interior permanent magnet type motor having an inner rotor 120.

Figure 2:
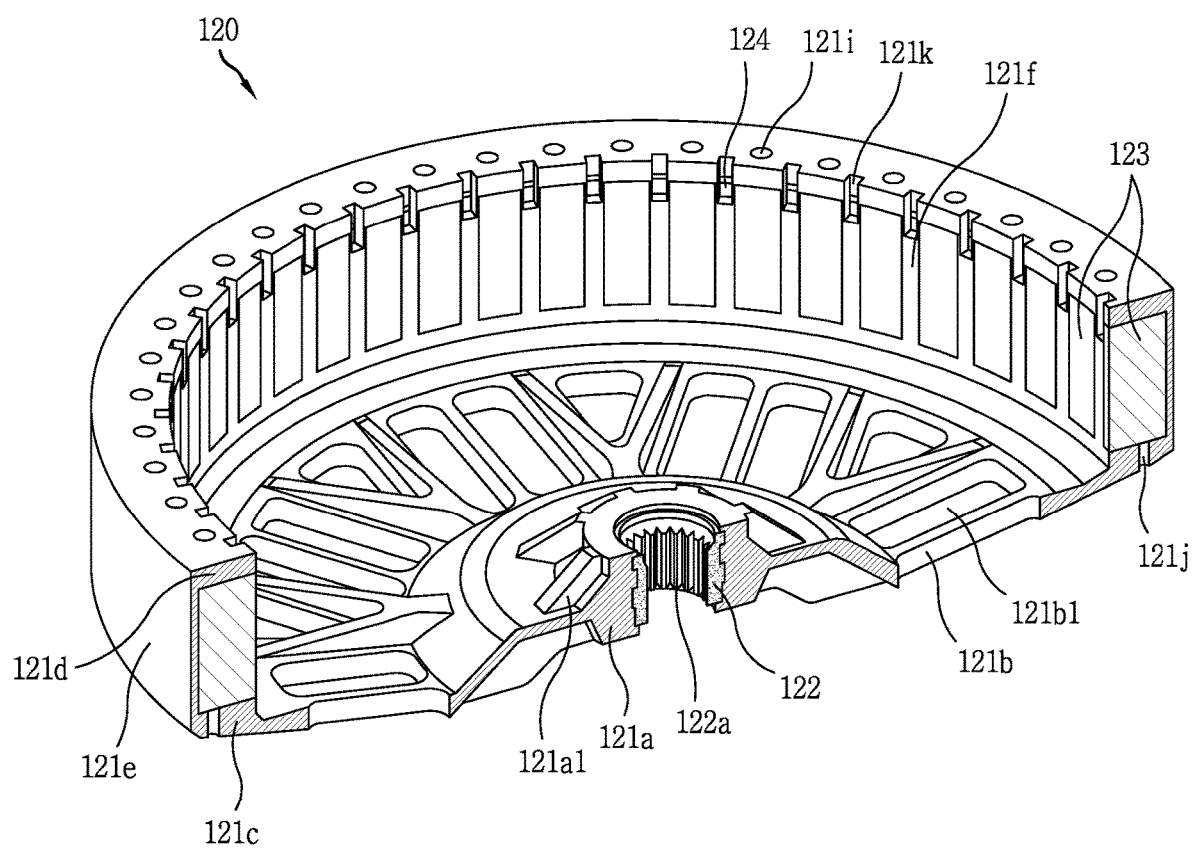
FIG. 2 is a perspective view showing an example rotor illustrated in FIG. 1 in a state cut along an axial direction.

Elements with reference numerals that are not described in FIG. 1 will be described with reference to FIG. 2 illustrating only the rotor 120 excluding the stator 110.

FIG. 2 is a perspective view showing a state in which the rotor 120 illustrated in FIG. 1 is cut along an axial direction.

Figure 3:
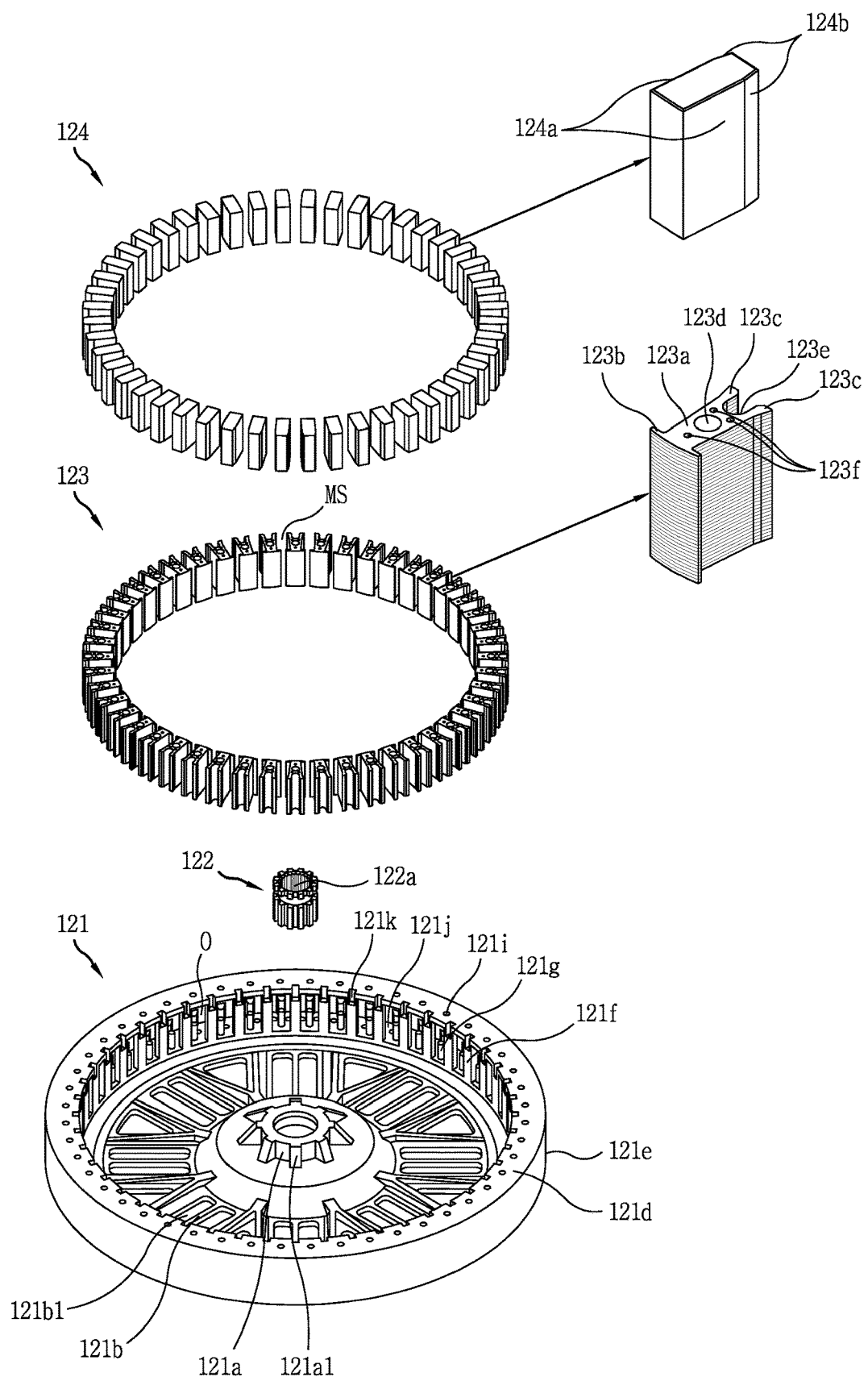
FIG. 3 is an exploded perspective view of the rotor of FIG. 1.

FIG. 3 is an exploded perspective view of the rotor 120.

Figure 4:
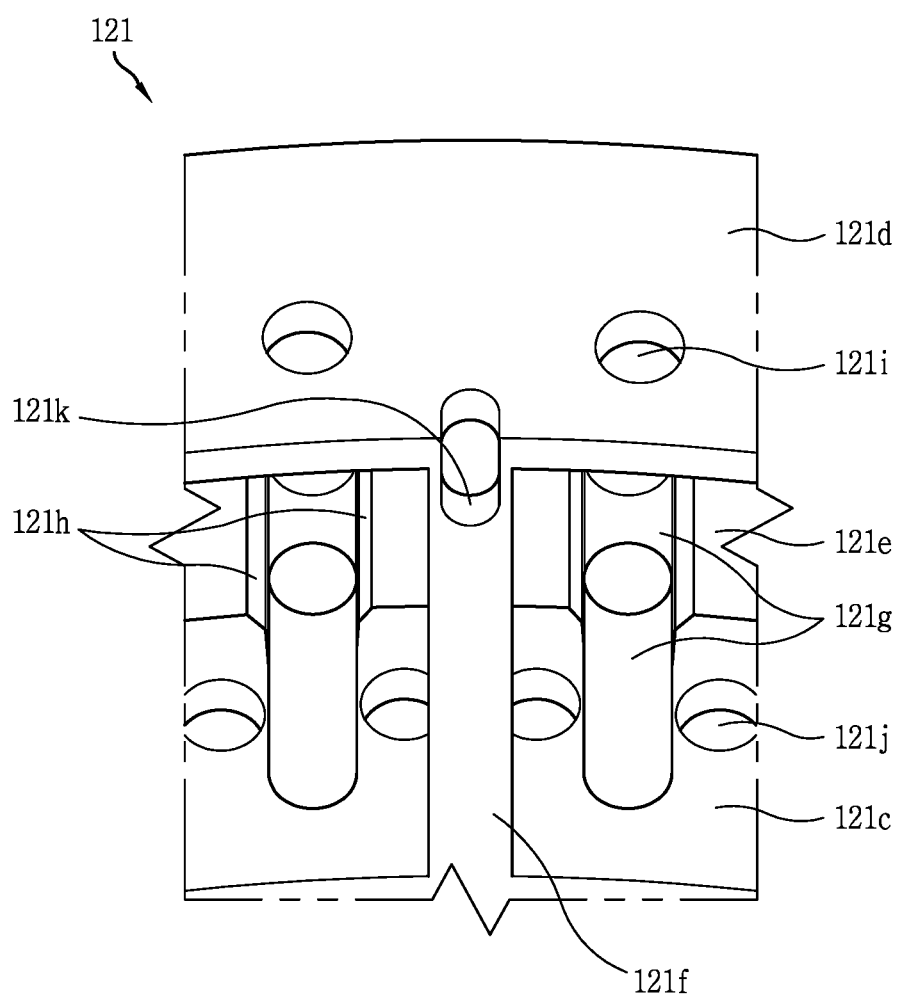
FIG. 4 is an enlarged partial perspective view showing an example portions of the rotor illustrated in FIG. 3.

FIG. 4 is an enlarged partial perspective view showing a portion IV illustrated in FIG. 3.

The rotor 120 includes a plurality of rotor core segments 123, a plurality of permanent magnets 124, and a rotor frame 121.

The plurality of rotor core segments 123 are arranged apart from each other along a circumferential direction of the rotor 120 on an outer side of the stator 110 to form permanent magnet arrangement slots (MS). As the plurality of rotor core segments 123 are arranged apart from each other along a circumferential direction of the rotor 120, permanent magnet arrangement slots (MS) are formed between the two rotor core segments 123. A permanent magnet arrangement slot (MS) is a region surrounded by a side surface of the two rotor core segments 123, a head 123b of the two rotor core segments 123, and a protrusion 123c of the two rotor core segments 123 disposed adjacent to the permanent magnet arrangement slot (MS).

The plurality of rotor core segments 123 are formed by stacking a plurality of single electric steel sheets (e.g., magnetic bodies) along a direction parallel to an axial direction of the rotation shaft. The single electrical steel sheets may have the same shape. However, at least one electric steel sheet disposed at a lower end and at least one electric steel sheet disposed at an upper end with respect to the stacking direction of the electric steel sheets may be larger than other electric steel sheets to support the permanent magnet 124.

For example, seventy eight electrical steel sheets may be stacked to construct the rotor core segment 123 having a height of 39 mm with a single electrical steel sheet having a thickness of 0.5 mm in a direction parallel to an axial direction of the rotation shaft.

The rotor core segment 123 performs the role of concentrating a force of the permanent magnets 124. When the force of the permanent magnet 124 is concentrated on the rotor core segment 123, the performance of the motor 100 dramatically increases. However, when the plurality of rotor core segments 123 are connected to each other, the efficiency of the motor 100 is reduced. In some implementations, in order to improve the efficiency of the motor 100, the plurality of rotor core segments 123 may be spaced from each other.

Referring to FIG. 3, each rotor core segment 123 includes a body 123a, a head 123b, a protrusion 123c, a rotor core hole 123d, a rotor core slot 123e, and a mac 123f.

The body 123a corresponds to a portion occupying the largest volume of the rotor core segment 123. The body 123a is disposed to face the permanent magnet 124 in a circumferential direction of the rotor 120. Both side surfaces of the body 123a are disposed to face a first working surface 124a of the permanent magnet 124, and are in surface contact with the first working surface 124a.

It will be understood that the plurality of rotor core segments 123 are arranged along a side face of the hollow cylinder. A portion located on a circumference corresponding to an inner diameter of the cylinder corresponds to an inner end of the body 123a. Furthermore, an outer end of the body 123a indicates a portion formed with the protrusion 123c and the rotor core slot 123e to be described later. The inner end of the body 123a is disposed to face the stator 110 at a position spaced apart from the stator 110.

A width of the body 123a with respect to a circumferential direction of the rotor 120 may be formed to gradually increase from the inner end to the outer end of the body 123a. For instance, a linear distance between both side surfaces of the body 123a in a circumferential direction of the rotor 120 gradually increases from the inner end to the outer end of the body 123a.

When an imaginary first circumference corresponding to an inner end of the rotor core segment 123 is compared with an imaginary second circumference corresponding to an outer end of the rotor core segment 123, the second circumference is larger than the first circumference. When the first working surface 124a of the permanent magnet 124 may extend along a direction parallel to a radial direction of the rotor 120, an area based on a difference between the first circumference and the second circumference may be filled by the rotor core segment 123. A width of the body 123a with respect to a circumferential direction of the rotor 120 to fill the area may gradually increase from the inner end to the outer end. Accordingly, the plurality of rotor core segments 123 and the plurality of permanent magnets 124 in a circumferential direction of the rotor 120 may be arranged without a hollow space.

The head 123b may protrude from an inner end of the body 123a to both sides thereof toward a circumferential direction of the rotor 120. A single rotor core segment 123 may include two heads 123b.

Two heads 123b may be disposed at positions facing an inner surface of the permanent magnet 124 with respect to a single permanent magnet 124. The two heads 123b restrict the movement of the permanent magnet 124 toward the rotation shaft. Either one of the two heads 123b corresponds to a head 123b of the rotor core segment 123 disposed on one side of the permanent magnet 124, and the other one corresponds to a head 123b of the rotor core segment 123 disposed on the other side of the permanent magnet 124.

The two heads 123b are disposed apart from each other in a circumferential direction of the rotor 120. When the two heads 123b are connected to each other, the performance of the motor 100 is deteriorated. In order to maximize the performance of the motor 100, in some implementations, all the rotor core segments 123 are spaced apart from each other and all the permanent magnets 124 are spaced apart from each other. In some implementations, from the viewpoint of the performance of the motor 100, the two heads 123b may be also spaced from each other.

The protrusion 123c may protrude from an outer end of the body 123a. The protrusion 123c may extend in two directions away from each other to form the rotor core slot 123e. One rotor core segment 123 may include two protrusions 123c. The two protrusions 123c are protruded toward a direction inclined to a radial direction of the rotor 120. Both side surfaces of the protrusion 123c are arranged to face the second working surface 124b of the permanent magnet 124, and are in surface contact with the second working surface 124b.

Two protrusions 123c may be disposed at a position facing an outer surface of one permanent magnet 124 with respect to the permanent magnet 124. The two protrusions 123c restrain the permanent magnet 124 that is about to move toward a direction away from the rotation shaft due to a centrifugal force during the operation of the motor 100. Either one of the two protrusions 123c corresponds to a protrusion 123c of the rotor core segment 123 disposed on one side of the permanent magnet 124, and the other one of the two protrusions 123c corresponds to a protrusion 123c disposed on the other side of the permanent magnet 124.

The two protrusions 123c may be disposed apart from each other in a circumferential direction of the rotor 120. In some cases, when the two protrusions 123c are connected to each other, the performance of the motor 100 may be deteriorated. In some implementations, to maximize the performance of the motor 100, all the rotor core segments 123 may be spaced apart from each other and all the permanent magnets 124 are spaced apart from each other. In some implementations, for the performance of the motor 100, the two protrusions 123c may be also spaced apart from each other.

In some examples, the rotor core hole 123d may be defined in the body 123a. The rotor core hole 123d is open toward a direction parallel to an axial direction of the rotation shaft (in a vertical direction in FIGS. 2 and 3). The rotor core hole 123d may be located between inner and outer ends of the body 123a in a radial direction of the rotor 120. The rotor core slot 123e may be located at an outer end of the body 123a, and thus the hole may be located between an inner end of the body 123a and the rotor core slot 123e in a radial direction of the rotor 120.

The rotor core slot 123e may be located between the two protrusions 123c in a circumferential direction of the rotor 120. It will be understood that the rotor core slot 123e has a shape recessed toward the body 123a between the two protrusions 123c with respect to a radial direction of the rotor 120. A circumference of the rotor core slot 123e may include a curved surface having a cross section of a semicircle or a shape similar to a semicircle.

The rotor core hole 123d and the rotor core slot 123e are regions accommodating a mold pin in an insert injection molding process to be described later or accommodating a molten injection material. For insert injection molding, the plurality of rotor core segments 123 may be seated in a mold, and the plurality of rotor core segments 123 may be fixed in place in the mold. A plurality of mold pins are formed in the mold to fix each rotor core segment 123 in place. When the rotor core segment 123 is placed in the mold to insert each of the mold pins into the rotor core hole 123d or the rotor core slot 123e, the fixing of each rotor core segment 123 is completed.

When the plurality of rotor core segments 123 are seated in place in the mold using the mold pins, and them the molten injection material is injected into the mold, the injection material is filled into the rotor core holes 123d and the rotor core slots 123e. When insert injection molding is completed and an injection product (molded article) is separated from the mold, the rotor core hole 123d and the rotor core slot 123e remain in a region where the mold pin has been present. The rotor frame pin 121g and the pin reinforcing rib 121h, to be described later, are formed in a region filled with the injection material.

The mac 123f may be defined at each single electrical steel sheet of each rotor core segment 123. The mac 123f may be a dimple that is recessed in one side of each steel sheet and protrudes from the other side of each steel sheet. For example, the mac 123f may protrude from one surface of each electrical steel sheet, and may have a protruding shape that is recessed from the other surface at the same position as the protruding position. A plurality of macs 123f may be disposed around the rotor core holes 123d. For example, FIG. 3 illustrates three macs 123f defined on each electrical steel sheet.

The mac 123f may be a structure or a mating part for aligning and stacking single electrical steel sheets at positions corresponding to each other. When a plurality of electric steel sheets are stacked in such a manner that either one protruded mac 123f between the two electric steel sheets disposed to face each other is inserted into the other recessed mac 123f, the electrical steel sheets constituting the rotor core segment 123 may be aligned with each other along a direction parallel to an axial direction of the rotation shaft.

The plurality of rotor core segments 123 are exposed on an inner side of the rotor 120 in a radial direction of the rotor 120. Here, the inner side of the rotor 120 refers to a position at which the bushing 122 is installed.

The plurality of permanent magnets 124 may be inserted one by one into the permanent magnet arrangement slots (MS) formed by the plurality of rotor core segments 123 so as to be arranged along a circumferential direction of the rotor 120. The plurality of permanent magnets 124 and the plurality of rotor core segments 123 are alternately arranged one by one, and thus the same number of permanent magnets 124 and the rotor core segments 123 are provided in the rotor 120.

Each permanent magnet 124 has a first working surface 124a and a second working surface 124b. The magnetic field lines of the permanent magnet 124 are generated from the first working surface 124a and the second working surface 124b.

The first working surface 124a corresponds to the largest surface of the permanent magnet 124. The first working surface 124a faces a circumferential direction of the rotor 120. The first working surface 124a may be parallel to a radial direction of the rotor 120. The first working surface 124a faces a side surface of the body 123a in a circumferential direction of the rotor 120. The first working surface 124a is in surface contact with a side surface of the body 123a.

The second working surface 124b forms a boundary at an obtuse angle with the first working surface 124a. When the second working surface 124b forms a boundary at an obtuse angle with the first working surface 124a, the second working surface 124b may be inclined to a radial direction of the rotor 120. In some examples, a direction toward the rotation shaft may be referred to as an inner direction of the rotor 120, and a direction away from the rotation shaft may be referred to as an outer direction of the rotor 120. The second working surface 124b is formed in an outer direction of the rotor 120 compared to the first working surface 124a. That is, the second working surface 124b may be disposed radially outward of the first working surface 124a.

In some implementations, the first working surface 124a and the second working surface 124b may define an obtuse angle at an interface or boundary, and an edge may be located at the boundary between the first working surface 124a and the second working surface 124b. The edge may extend parallel to an axial direction of the rotation shaft.

When the first working surface 124a and the second working surface 124b form a boundary at an obtuse angle, a width of the permanent magnet 124 based on a circumferential direction of the rotor 120 gradually decreases from a boundary between the first working surface 124a and the second working surface 124b to an outer end of the permanent magnet 124. An outer end of the permanent magnet 124 being gradually decreased by the second working surface 124b corresponds to a gradually increasing protrusion 123c of the rotor core segment 123.

When the plurality of permanent magnets 124 are seen from an inner side of the rotor 120 with respect to a radial direction of the rotor 120, the plurality of permanent magnets 124 are covered by the plurality of rotor core segments 123 and an inner pillar 121f of the rotor frame 121. Furthermore, when the plurality of permanent magnets 124 are seen from an outer side of the rotor 120, the plurality of permanent magnets 124 are covered by the outer wall 121e of the rotor frame 121. Here, the inner side of the rotor 120 refers to a position at which the bushing 122 is installed. Furthermore, the outer side of the rotor 120 refers to a position corresponding to an opposite side of the bushing 122 in a radial direction with respect to the plurality of rotor core segments 123 or the plurality of permanent magnets 124.

Each of the plurality of rotor core segments 123 and the plurality of permanent magnets 124 has a first end and a second end in a direction parallel to an axial direction of the rotation shaft. Here, the first end refers to a lower end of the plurality of rotor core segments 123, and a lower end of the plurality of permanent magnets 124, with respect to a direction illustrated in FIG. 2. Furthermore, the second end refers to an upper end of the plurality of rotor core segments 123, and an upper end of the plurality of permanent magnets 124.

However, ordinal numbers, first and second, do not have a special meaning in the ordinal number in that they are added to distinguish each other. Therefore, the upper end of the plurality of rotor core segments 123 and the upper end of the plurality of permanent magnets 124 may be also referred to as a first end. In addition, the lower end of the plurality of rotor core segments 123 and the lower end of the plurality of permanent magnets 124 may be also referred to as a second end.

The detailed structure of the rotor frame 121 will be described with reference to FIGS. 2 through 4.

The rotor frame 121 is connected to the rotation shaft through the bushing 122 installed at the bushing coupling portion 121a at a position facing the center of the stator 110. The rotor frame 121 is configured to fix the plurality of rotor core segments 123 and the plurality of permanent magnets 124. When the plurality of rotor core segments 123 and the plurality of permanent magnets 124 are inserted into the mold to form the rotor frame 121, the rotor frame 121 is integrated with the plurality of rotor core segments 123 and the plurality of permanent magnets 124.

Here, the meaning of being integrated denotes that a single body is formed by insert injection molding, to be described later. The assembly may be formed by sequentially combining parts with one another and disassembled in the reverse order of the combination. In some examples, the integrated body does not have the concept of assembly or disassembly and therefore differs from the assembly in that it is not disassembled unless damaged at discretion.

The rotor frame 121 may have a cylindrical shape having a hollow portion and a bottom surface. The rotor frame 121 may include a bushing coupling portion 121a, a spoke 121b, a first end base 121c, a second end base 121d, an outer wall 121e, a plurality of inner pillars 121f, a rotor frame pin 121g, a pin reinforcing rib 121h, a rotor frame hole 121i, a plurality of rotor core fixing jig holes 121j, and a plurality of permanent magnet fixing jig holes 121k.

The bushing coupling portion 121a and the spoke 121b have been described above with reference to FIG. 1.

The first end base 121c may have an annular shape so as to cover a first end of the plurality of rotor core segments 123 and a first end of the plurality of permanent magnets 124. The first end base 121c is formed on an outer circumference of the spokes 122b. The first end base 121c covers the first end of the plurality of rotor core segments 123 and the first end of the plurality of permanent magnets 124 in a direction (at a lower side) parallel to an axial direction of the rotation shaft. The first end base 121c supports the first end of the plurality of rotor core segments 123 and the first end of the plurality of permanent magnets 124.

The second end base 121d is formed in an annular shape so as to cover a second end of the plurality of rotor core segments 123 and a second end of the plurality of permanent magnets 124. The second end base 121d covers the second end of the plurality of rotor core segments 123 and the second end of the plurality of permanent magnets 124 in a direction (at an upper side) parallel to an axial direction of the rotation shaft. The second end base 121d supports the second end of the plurality of rotor core segments 123 and the second end of the plurality of permanent magnets 124.

The first end base 121c and the second end base 121d may be disposed at positions spaced from each other in a direction parallel to an axial direction of the rotation shaft. The first end base 121c and the second end base 121d are disposed to face each other in a direction parallel to an axial direction of the rotation shaft. The movement of the plurality of rotor core segments 123 and the movement of the plurality of permanent magnets 124 in a direction parallel to an axial direction of the rotation shaft is prevented by the first end base 121c and the second end base 121d.

The outer wall 121e may surround the protrusions 123c of the plurality of rotor core segments 123 and the outer ends of the plurality of permanent magnets 124 in a radial direction of the rotor 120. As will be described later, the rotor frame pin 121g is inserted into the rotor core slot 123e, and the outer wall 121e is inserted into the rotor core segment 123 and an outer side of the rotor frame pin 121g in a radial direction of the rotor 120. For instance, the outer wall 121e may extend in a direction parallel to an axial direction of the rotation shaft so as to connect the first end base 121c and the second end base 121d to each other, and extended along an outer end of the first end base 121c and an outer end of the second end base 121d.

The outer wall 121e may be located at the outermost of the rotor frame 121. Therefore, the plurality of rotor core segments 123 and the plurality of permanent magnets 124 are all covered by the outer wall 121e on an outer side of the rotor 120.

The plurality of inner pillars 121f are extended in a direction parallel to an axial direction of the rotation shaft so as to connect an inner end of the first end base 121c and an inner end of the second end base 121d to each other. Here, the inner end refers to a circumferential portion corresponding to an inner diameter of the rotor frame 121.

The plurality of inner pillars 121f may be disposed at positions spaced apart from each other along a circumferential direction of the rotor frame 121. Here, the circumferential direction of the rotor frame 121 refers to a circumferential direction of the inner end of the first end base 121c and/or a circumferential direction of the inner end of the second end base 121d.

Since the plurality of inner pillars 121f are spaced apart from each other, an opening (O) is formed for each region defined by the inner end of the first end base 121c, the inner end of the second end base 121d, and the inner pillar 121f.

The inner end of the plurality of rotor core segments 123 are exposed in a radial direction of the rotor 120 through the opening (O). The inner end of the rotor core segment 123 refers to an inner end of the body 123a. The inner end of the rotor core segment 123 exposed in a radial direction of the rotor 120 faces the stator 110.

Referring to FIG. 2, the plurality of rotor core segments 123 and the plurality of inner pillars 121f are alternately formed one by one along a circumferential direction of the rotor frame 121. Furthermore, the plurality of permanent magnets 124 are covered by the plurality of rotor core segments 123 and the plurality of inner pillars 121f in a radial direction of the rotor frame 121.

The head 123b of each rotor core segment 123 and each inner pillar 121f are in surface contact with each other in an inclined direction with respect to a radial direction of the rotor frame 121. Accordingly, the plurality of inner pillars 121f support the plurality of rotor core segments 123 in a radial direction. Furthermore, the movement of the plurality of rotor core segments 123 toward an inner side of the rotor frame 121 (toward the rotation shaft) is prevented by the plurality of inner pillars 121f.

A plurality of rotor frame pins 121g are protruded from the first end base 121c toward the second end base 121d. The plurality of rotor frame pins 121g are extend along a direction parallel to an axial direction of the rotation shaft.

In some cases, the plurality of rotor frame pins 121g may also be protruded from the second end base 121d toward the first end base 121c.

The plurality of rotor frame pins 121g are formed between an inner end of the first end base 121c and the outer wall 121e in a radial direction of the rotor frame 121. Furthermore, the plurality of rotor frame pins 121g may be formed at positions spaced apart from each other along a circumferential direction of the rotor frame 121. Two or more rotor frame pins 121g may also be formed in the same radial direction.

When two or more rotor frame pins 121g are formed in the same radial direction, any one may be located at a position relatively away from the outer wall 121e and the other one may be located at a position relatively close to the outer wall 121e. The rotor frame pin 121g formed at a position relatively away from the outer wall 121e is inserted into the rotor core hole 123d of the rotor core segment 123.

The pin reinforcing rib 121h for reinforcing connection strength with the outer wall 121e may be formed around the rotor frame pin 121g formed relatively close to the outer wall 121e in the same radial direction. The pin reinforcing ribs 121h may be formed on both sides of each rotor frame pin 121g. The pin reinforcing rib 121h may connect the rotor frame pin 121g and the outer wall 121e. The pin reinforcing rib 121h may have the same height as the rotor frame pin 121g in a direction parallel to an axial direction of the rotation shaft. The rotor frame pin 121g located relatively close to the outer wall 121e and the pin reinforcing ribs therearound are inserted into the rotor core slot 123e of the rotor core.

When the rotor frame 121 is formed by insert injection molding, the rotor frame pin 121g and the pin reinforcing rib 121h may be defined in a region filled with the molten injection material. Accordingly, the rotor frame pin 121g located at a position relatively far from the outer wall 121e may have a shape corresponding to the rotor core hole 123d of the rotor core segment 123. In addition, the rotor frame pin 121g located relatively close to the outer wall 121e and the pin reinforcing rib 121h therearound have a shape corresponding to the rotor core slot 123e.

The rotor frame hole 121i may be defined at a position facing the rotor frame 121 along a direction parallel to an axial direction of the rotation shaft. When the rotor frame pin 121g is disposed in the first end base 121c, the rotor frame hole 121i may be defined in the second end base 121d. In some examples, when the rotor frame pin 121g is disposed in the second end base 121d, the rotor frame hole 121i may be defined in the first end base 121c.

The rotor frame hole 121i may be defined at a position where the mold pin has been disposed during insert injection molding for producing the rotor 120. Even though the molten raw material for insert injection molding is filled in the mold, the molten injection material is only filled above or below the mold pin, and molten injection material cannot exist at the position where the mold pin exists. Therefore, the rotor frame pin 121g and the pin reinforcing rib remain in a region where the molten injection material has existed as a result of insert injection molding, and the rotor frame hole 121i remains in a region where the mold pin has existed.

The rotor 120 may be disengaged from the mold pin when the rotor 120 that has completed insert injection molding is separated from the mold. It will be understood that a distance between the rotor frame pin 121g and the rotor frame hole 121i corresponds to a length of the mold pin. It will be understood that the sum of a length of the mold pin and a length of the rotor frame pin 121g is a distance between the first end base 121c and the second end base 121d. Accordingly, a length of the rotor frame pin 121g in a direction parallel to an axial direction of the rotation shaft is smaller than a distance (H) between the first end base 121c and the second end base 121d.

The plurality of rotor core fixing jig holes 121j may be defined in either one of the first end base 121c and the second end base 121d. The plurality of rotor core fixing jig holes 121j may be arranged along a circumference between the outer wall 121e and the inner pillar 121f. The plurality of rotor core fixing jig holes 121j may be defined at positions spaced apart from each other.

A rotor core fixing jig for fixing the plurality of rotor core segments 123 may be formed in a mold for producing the rotor 120. A rotor core fixing jig closely adheres each of the rotor core segments 123 seated on a mold pin to the mold pin along a direction parallel to an axial direction of the rotation shaft. Therefore, each of the rotor core segments 123 may be fixed along this direction.

Even though the molten raw material for insert injection molding is filled in the mold, the molten raw material may not exist at the position where the rotor core fixing jig exists. Therefore, as a result of insert injection molding, the rotor core fixing jig hole 121j may remain.

The permanent magnet fixing jig hole 121k may be located at a boundary between the first end base 121c and the inner pillar 121f or formed at a boundary between the second end base 121d and the inner pillar 121f. The permanent magnet fixing jig holes 121k may be disposed at positions corresponding to the respective permanent magnets 124 in a radial direction of the rotor frame 121.

A permanent magnet fixing jig for fixing the plurality of permanent magnets 124 may be formed on a mold for producing the rotor 120. The permanent magnet fixing jig closely adheres each of the permanent magnets 124 seated on a mold pin to the mold pin along a direction parallel to an axial direction of the rotation shaft. Therefore, each of the permanent magnets 124 may be fixed along this direction.

In some examples, where the molten raw material for insert injection molding is filled in the mold, the molten raw material may not exist at the position where the permanent magnet fixing jig exists. Therefore, as a result of insert injection molding, the permanent magnet fixing jig hole 121k may remain. The position of the permanent magnet 124 may be visually checked from an outer side of the rotor frame 121 through the permanent magnet fixing jig hole 121k since the permanent magnet 124 is visually exposed through the permanent magnet fixing jig hole 121k.

In some examples, where the head 123b is disposed on the rotor core segment 123, an inclination of the permanent magnet 124 in a direction of the rotation shaft in the mold may be prevented. Accordingly, the permanent magnet fixing jig hole 121k is not formed at a boundary between the first end base 121c and the outer wall 121e or at a boundary between the second end base 121d and the outer wall 121e.

Hereinafter, the size, shape, and other features of the rotor core segment 123 and the permanent magnet 124 will be described.

Figure 5:
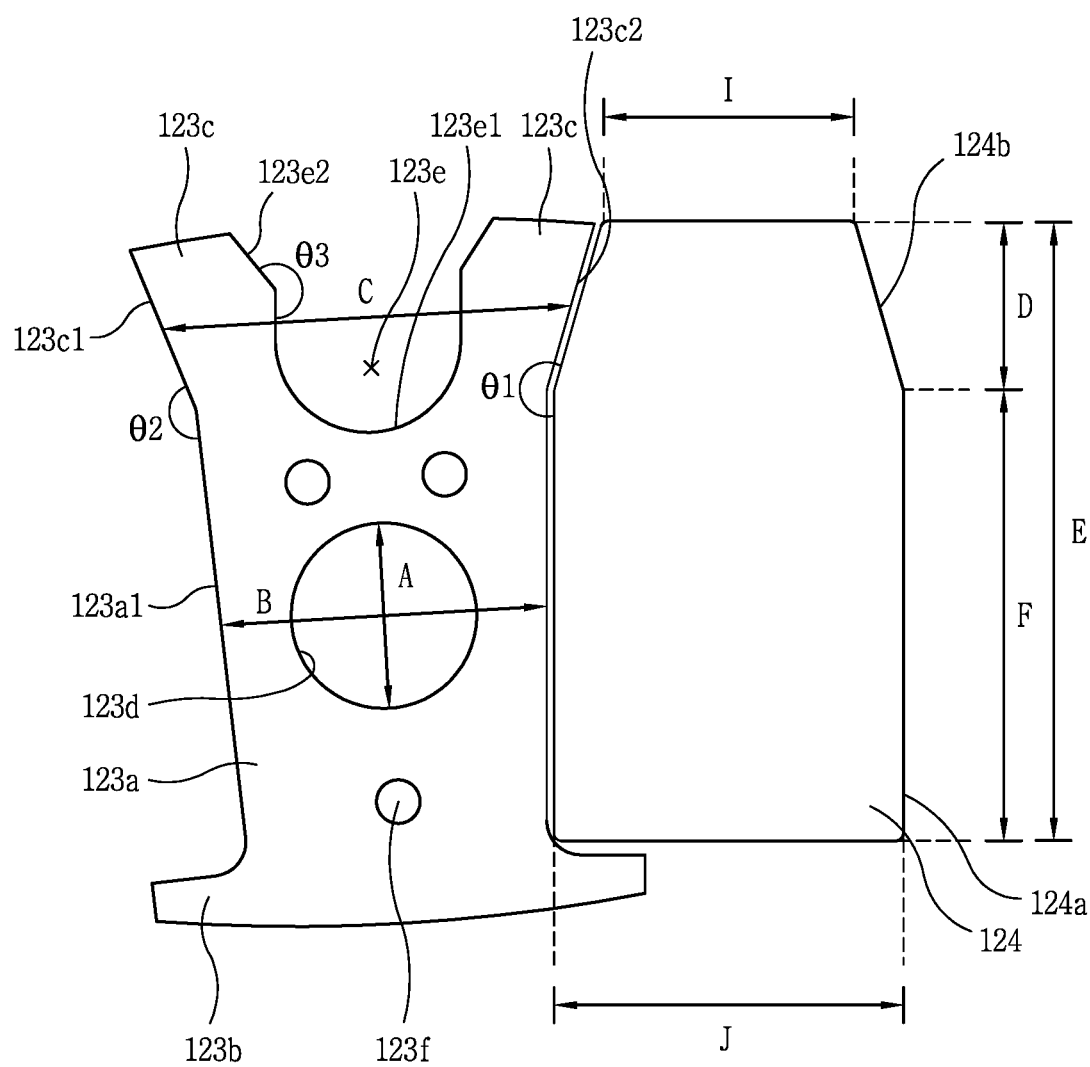
FIG. 5 is a plan view showing an example rotor core segment and an example permanent magnet.

FIG. 5 is a plan view showing the example rotor core segment 123 and the example permanent magnet 124.

The rotor core segment 123 may perform the role of concentrating a magnetic force generated from the permanent magnets 124. Since the rotor core segment 123 provides a path of magnetic flux, the magnetic flux may be concentrated by the rotor core segment 123. In some examples, the rotor may have a structure in which the rotor core segments 123 are completely separated from each other and the permanent magnets 124 are completely separated from each other (so-called fully split structure) considering the performance of the motor 100.

In some cases, the fully split structure may cause the scattering of the plurality of rotor core segments 123 and the plurality of permanent magnets 124 due to a strong centrifugal force. Accordingly, in order to prevent the scattering of the rotor core segments 123 and the plurality of permanent magnets 124, even though the volume of the rotor core segments 123 and the permanent magnets 124 is somewhat sacrificed, a structure for restricting the plurality of rotor core segments 123 and the plurality of permanent magnets 124 is indispensably required.

The rotor core hole 123d and the rotor core slot 123e formed in the rotor core segment 123 may be configured to fix the rotor core segment 123 by inserting the rotor frame pin 121g thereinto. In some cases, where the rotor core hole 123d or the rotor core slot 123e is formed in the rotor core segment 123, the performance degradation of the motor 100 may occur due to a volume reduction of the rotor core segment 123. Therefore, the shape, size and position of the rotor core hole 123d and the rotor core slot 123e may have an effect on the structural strength of the rotor 120, the performance of the motor 100, and the like. For example, the structural strength of the rotor 120 and the performance of the motor 100 may be regarded as a trade-off relationship.

The present disclosure describes examples of the size and shape of the rotor core segment 123 and the permanent magnet 124 capable of suppressing the performance degradation of the motor 100 while increasing the structural strength of the rotor 120.

First, the position of the rotor core hole 123d formed in the rotor core segment 123 will be described. The size and shape of two permanent magnets 124 disposed on both sides of one rotor core segment 123 are the same. Therefore, magnetic force lines generated from the permanent magnet 124 disposed on one side of the rotor core segment 123 and magnetic force lines generated from the permanent magnets 124 disposed on the other side of the rotor core segment 123 are symmetrical to each other.

The rotor core hole 123d may be defined at the center of the body 123a in a circumferential direction of the rotor in order to minimize the effect of the rotor core hole 123d formed in the rotor core segment 123 on the magnetic field lines generated from the permanent magnets 124 on both sides thereof. If the rotor core hole 123d deviates from the center of the body 123a, then magnetic force lines generated from either one of the permanent magnets 124 on both sides thereof are saturated, thereby causing the performance degradation of the motor 100.

In some implementations, the rotor core hole 123d may be defined close to an outer end between the inner and outer ends of the body 123a. Since a size of the first working surface 124a is larger than that of the second working surface 124b, magnetic force lines are generated more from the first working surface 124a. The first working surface 124a in a radial direction of the rotor 120 is formed on the inner side relative to the second working surface 124b, and thus the rotor core hole 123d may be disposed close to the outer end to increase a region between an inner end of the body 123a and the rotor core hole 123d (a region providing a path of magnetic force lines).

Next, a size of the rotor core hole 123d will be described. When a diameter of the rotor core hole 123d is A and a linear distance between both side surfaces of the rotor core segment 123 is B, a ratio of the two distances (A/B) may be 0.4 to 0.7. The distance between both side surfaces of the rotor core segment 123 corresponds to a distance between both side surfaces of the body 123a. However, since a width of the body 123a in a circumferential direction of the rotor 120 gradually increases from the inner end to the outer end, it may not be a constant value. Therefore, a linear distance (B) between both side surfaces of the body 123a may be selected as a linear distance connecting the middle portions of the both side surfaces to each other. This linear distance corresponds to an average of various non-constant B values.

If the ratio (A/B) is smaller than 0.4, the size of the rotor core hole 123d, the size of the rotor frame pin 121g inserted into the rotor core hole 123d, and the size of the mold pin are also reduced. This may be insufficient to improve the structural strength of the rotor 120. Conversely, if the ratio (A/B) is larger than 0.7, the rotor core hole 123d becomes excessively large, thereby causing the performance degradation of the motor 100. When the linear distance (B) between both side surfaces of the body 123a is 8.8 mm and the diameter (A) of the rotor core hole 123d is 5 mm, the ratio (A/B) is 0.57, and the ratio is an appropriate value existing within the range.

A linear distance between the rotor core hole 123d and the rotor core slot 123e and a linear distance between the rotor core hole 123d and the mac 123f are also factors that determine the structural strength of the rotor core segment 123. If these distances are set to sufficiently large values, then the structural strength of the rotor core segment 123 is not affected. However, if the linear distance between the rotor core hole 123d and the rotor core slot 123e is less than 0.45 mm, then the rotor core segment 123 may be broken between the rotor core hole 123d and the rotor core slot 123e. Furthermore, if the linear distance between the rotor core hole 123d and the mac 123f is less than 0.45 mm, then the rotor core segment 123 may be broken between the rotor core hole 123d and the mac 123f. Accordingly, the linear distance between the rotor core hole 123d and the rotor core slot 123e and the linear distance between the rotor core hole 123d and the mac 123f may be both 0.45 mm or more.

In some implementations, the linear distance (B) between both side surfaces of the body 123a may gradually increase toward an outer side of the rotor core segment 123. The linear distance (C) between the two side surfaces 123c1, 123c2 formed on the outer sides of the two protrusions 123c is also formed to gradually increase toward an outer side of the rotor core segment 123. As the first working surface 124a and the second working surface 124b form a boundary at an obtuse angle, the C is farther away than the B. For instance, an amount of increase in the C value is greater than an amount of increase in the B value toward the outer side of the rotor core segment 123 with respect to the same radial length.

This shape allows the two protrusions 123c to come into close contact with the second working surface 124b of the permanent magnet 124 at an outer side of the rotor core segment 123 so as to constrain the permanent magnet 124. Accordingly, the permanent magnet 124 is constrained by either one of the protrusions 123c of the rotor core segment 123 disposed on one side and either one the protrusions 123c of the rotor core segment 123 disposed on the other side to restrict the radial movement.

In some implementations, a size of obtuse angle formed by a boundary between the first working surface 124a and the second working surface 124b and a size of the permanent magnet 124 may be set to an appropriate value from the viewpoint of the performance of the motor 100 and the structural strength of the rotor 120.

The size of the obtuse angle ($\theta1$) formed by the boundary between the first working surface 124a and the second working surface 124b may be 190 to 230 degrees. If the size of the obtuse angle ($\theta1$) is smaller than 190 degree, then the scattering prevention effect is insufficient. Conversely, when the obtuse angle ($\theta1$) is larger than 230 degrees, the volume of the permanent magnet 124 becomes small, thereby causing the performance degradation of the motor 100.

The rotor core segment 123 also has an obtuse angled ($\theta2$) boundary to correspond to the boundary between the first working surface 124a and the second working surface 124b. For instance, a side surface of the body 123a and a side surface of the protrusion 123c also form a boundary at an obtuse angle ($\theta2$). A size of obtuse angle ($\theta2$) formed by the side surface of the body 123a and the side surface of the protrusion 123c is also 190 to 230 degrees. Accordingly, the side surface of the body 123a is brought into close contact with the first working surface 124a, and the side surface of the protrusion 123c is brought into close contact with the second working surface 124b.

In some examples, since the rotor frame pin 121g and the pin reinforcing rib 121h are inserted into the rotor core slot 123e, a boundary at an obtuse angle ($\theta3$) is also formed around the rotor core slot 123e.

When a radial length of the permanent magnet 124 is E and a radial length of the first working surface 124a is F, a radial length (D) of the second working surface 124b with respect to a radial direction of the rotor 120 may be defined as D=E−F. Since the second working surface 124b of the permanent magnet 124 is originally arranged to be inclined with respect to the radial direction, the length of the second working surface 124b may be measured with respect to the inclined direction. However, if the concept of the radial length of the second working surface 124b is introduced, it may be defined as D=E−F as described above.

A ratio (D/E) of the radial length (D) of the second working surface 124b to the radial length (E) of the permanent magnet 124 may be 0.15 to 0.35. If the ratio (D/E) is smaller than 0.15, then the size of the permanent magnet 124 becomes small, thereby causing the performance degradation of the motor 100. On the contrary, if the ratio (D/E) is larger than 0.35, then the scattering prevention effect is insufficient.

In some implementations, the permanent magnet 124 has an inner surface disposed to face the stator 110 in a radial direction of the rotor 120 and an outer surface disposed to face a side opposite to the inner surface. When the length of the outer surface of the rotor 120 with respect to the circumferential direction is I, and the length of the inner surface is J, a ratio (I/J) of the I to the J may be 0.6 to 0.8. In some examples, where the ratio (I/J) is less than 0.6, the size of the permanent magnet 124 becomes small, thereby causing the performance degradation of the motor 100. In some examples, where the ratio (I/J) is larger than 0.8, then the scattering prevention effect may be insufficient.

Hereinafter, another implementation of the present disclosure will be described.

Figure 6:
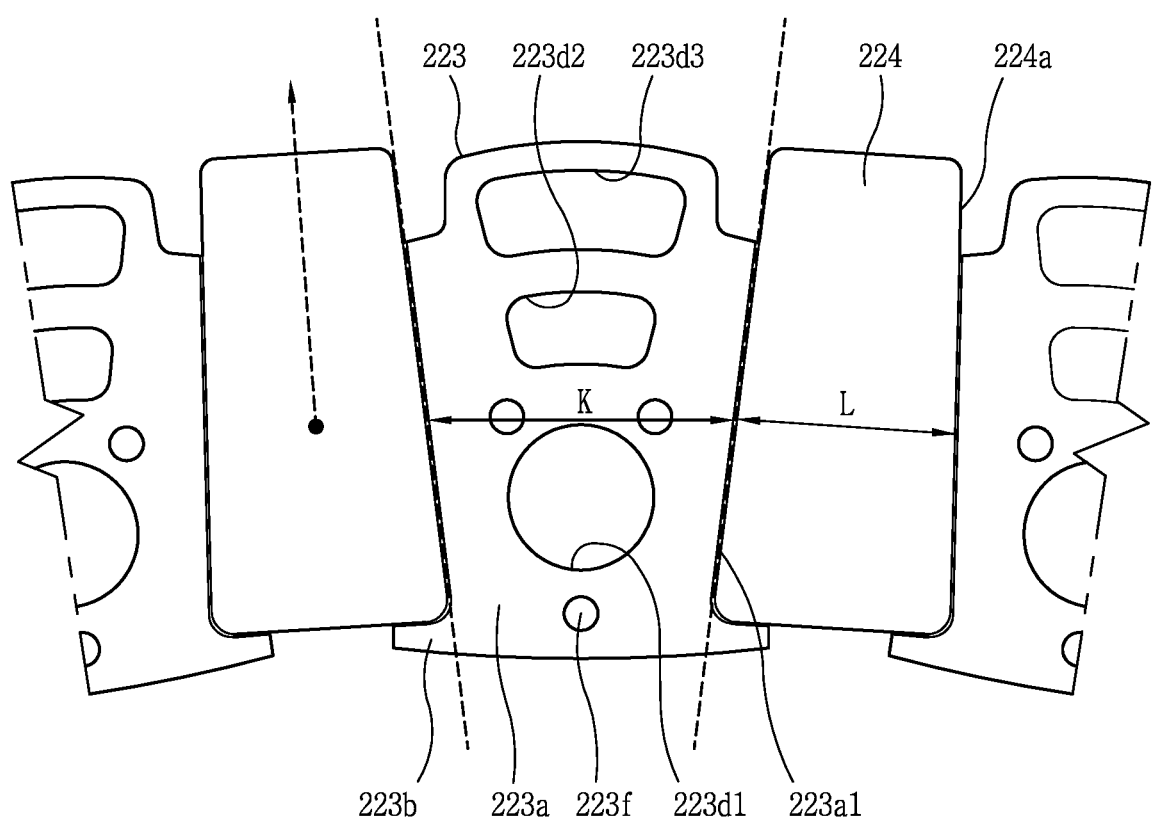
FIG. 6 is a plan view showing an example rotor core segment and an example permanent magnet.

FIG. 6 is a plan view showing an example rotor core segment 223 and an example permanent magnet 224.

The permanent magnet 224 has one working surface 224a on each of both sides. A distance (L) between the two working surfaces 224a gradually decreases from the inner end to the outer end of the permanent magnet 224. Furthermore, the permanent magnet 224 has a cross section whose sides are symmetrical with respect to an imaginary straight line extended along a radial direction of the rotor 120.

The rotor core segment 223 includes a body 223a, a head 223b, rotor core holes 223d1, 223d2, 223d3, and a mac 223f.

The description of the body 223a and the head 223b refers to the implementation described above.

In some implementations, the rotor core segment 223 may define the plurality of rotor core holes 223d1, 223d2, 223d3. The plurality of holes 223d1, 223d2, 223d3 are formed at positions spaced apart from each other along a circumferential direction of the rotor 120. Each of the rotor core holes 223d may be referred to as a first hole 223d1, a second hole 223d2, and a third hole 223d3 from the inner end of the rotor core segment 223. The first hole 223d1 is formed by a circular cross section. The second hole 223d2 and the third hole 223d3 may have an annular sector shape, and the third hole 223d3 may be larger than the second hole 223d2.

A plurality of macs 223f are formed around the first hole 223d1. As described above, a distance between the mac 223f and the first hole 223d1 may be 0.45 mm or more. Since the mac 223f is formed between the first hole 223d1 and the second hole 223d2, a distance between the mac 223f and the second hole 223d2 may be 0.45 mm or more.

Both side surfaces 223a1 of the rotor core segment 223 are symmetrical to each other with respect to a radial direction of the rotor core segment 223. A distance (K) between both side surfaces of the body 223a gradually decreases from the inner end to the outer end of the rotor core segment 223.

The shape of the rotor core segment 223 and the permanent magnet 224 prevents the radial scattering of the permanent magnet 224.

Figure 7:
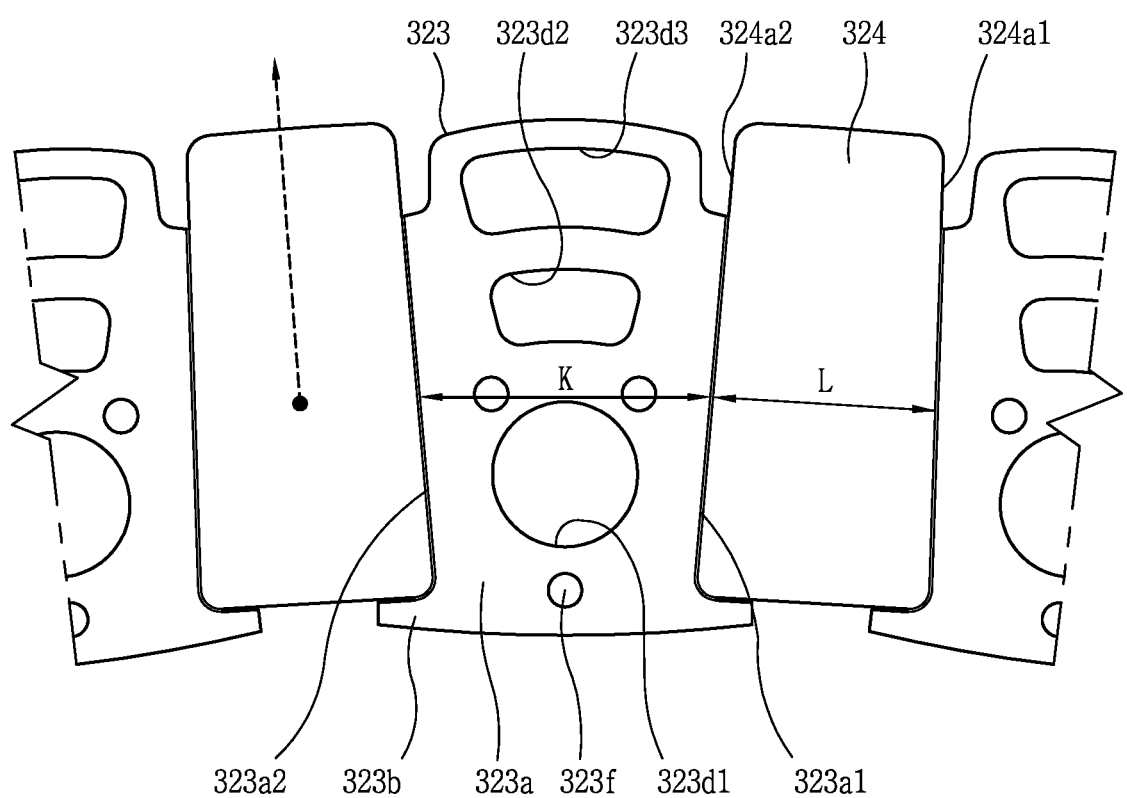
FIG. 7 is a plan view showing an example rotor core segment and an example permanent magnet.

FIG. 7 is a plan view showing an example rotor core segment 323 and am example permanent magnet 324.

The permanent magnet 324 has a cross section whose sides are asymmetrical with respect to an imaginary straight line extended along a radial direction of the rotor 120. Either one 324a2 of the two working surfaces 324a1, 324a2 of the permanent magnet 324 is inclined with respect to a radial direction of the rotor 120 and the other one 324a1 is parallel to the radial direction of the rotor 120. As a result, a distance between the two working surfaces 324a of the permanent magnet 324 gradually decreases toward an outer end of the permanent magnet 324.

The rotor core segment 323 also has a shape corresponding to the permanent magnet 324. Either one 323a2 of the two side surfaces 323a1, 323a2 of the body 323a may extend parallel to the radial direction of the rotor 120, and the other one 323a1 may be inclined with respect to the radial direction of the rotor 120. Accordingly, a linear distance (K) between the both side surfaces 323a1, 323a2 of the rotor core segment 323 gradually increases toward an outer end of the rotor core segment 323.

The side surface 323a2 parallel to the radial direction of the rotor 120 and the working surface 324a1 parallel to the radial direction of the rotor 120 are brought into close contact with each other while facing each other. The side surface 323a1 inclined in the radial direction of the rotor 120 and the working surface 324a2 inclined in the radial direction of the rotor 120 are also brought into close contact with each other while facing each other.

The shape of the rotor core segment 323 and the permanent magnet 324 prevents the radial scattering of the permanent magnet 324.

Figure 8:
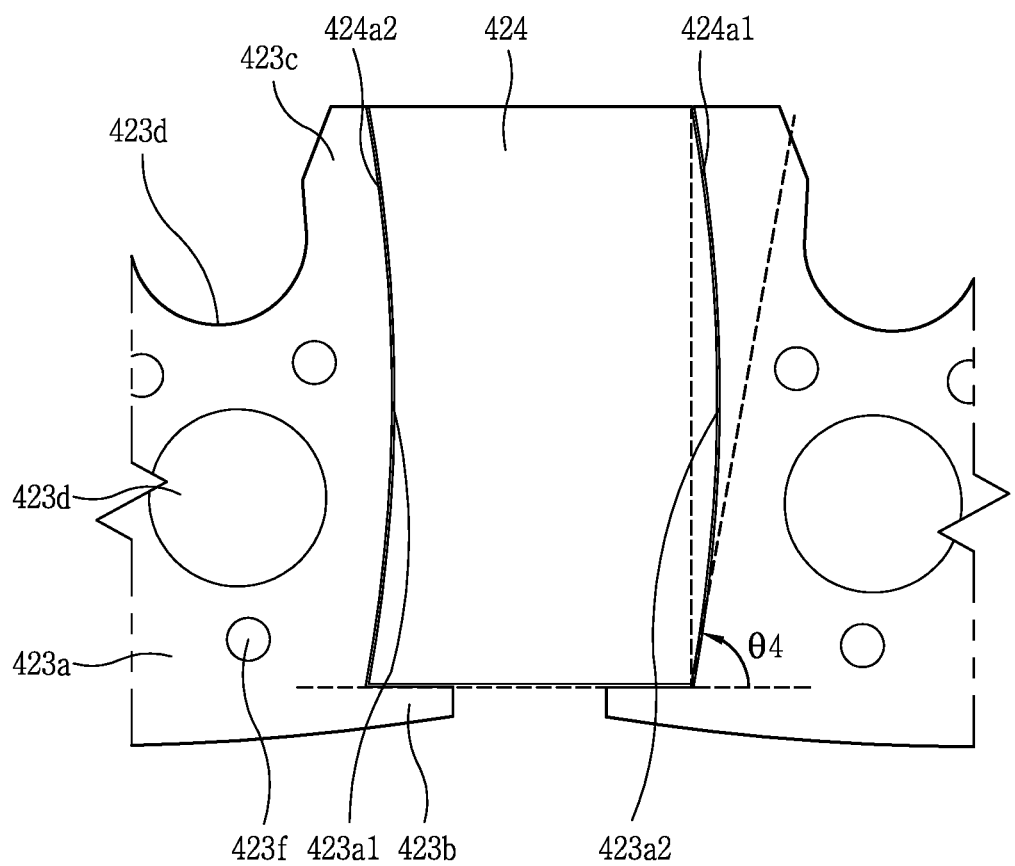
FIG. 8 is a plan view showing an example rotor core segment and an example permanent magnet.

FIG. 8 is a plan view showing an example rotor core segment 423 and an example permanent magnet 424.

The permanent magnet 424 is formed in an annular sector shape. Either one (e.g., 424a1) of the two working surfaces 424a1, 424a2 of the permanent magnet 424 may be formed in a convex curved surface, and the other one (e.g., 424b2) may be formed in a concave curved surface.

The body 423a of the rotor core segment 423 has a first side surface 423a1 and a second side surface 423a2.

The first side surface 423a1 is formed in a convex curved surface to correspond to the concave working surface 424a2 of the permanent magnet 424 disposed on one side of the rotor core segment 423 in a circumferential direction of the rotor 120. The concave working surface 424a2 of the permanent magnet 424 and the first side surface 423a1 are brought into surface contact with each other.

The second side surface 423a2 is formed in a concave curved surface to correspond to the convex working surface 424a1 of the permanent magnet 424 disposed on one side of the rotor core segment 423 in a circumferential direction of the rotor 120. The convex working surface 424a1 of the permanent magnet 424 and the second side surface 423a2 are brought into surface contact with each other.

In some examples, the second side surface 423a2 may define an angle ($\theta 4$) between an inner side surface of the permanent magnet 424 and a tangential direction of the concave shape of the second side surface 423a2. The angle ($\theta 4$) may be less than 90 degrees.

The shape of the rotor core segment 423 and the permanent magnet 424 prevents the radial scattering of the permanent magnet 424.

Figure 9:
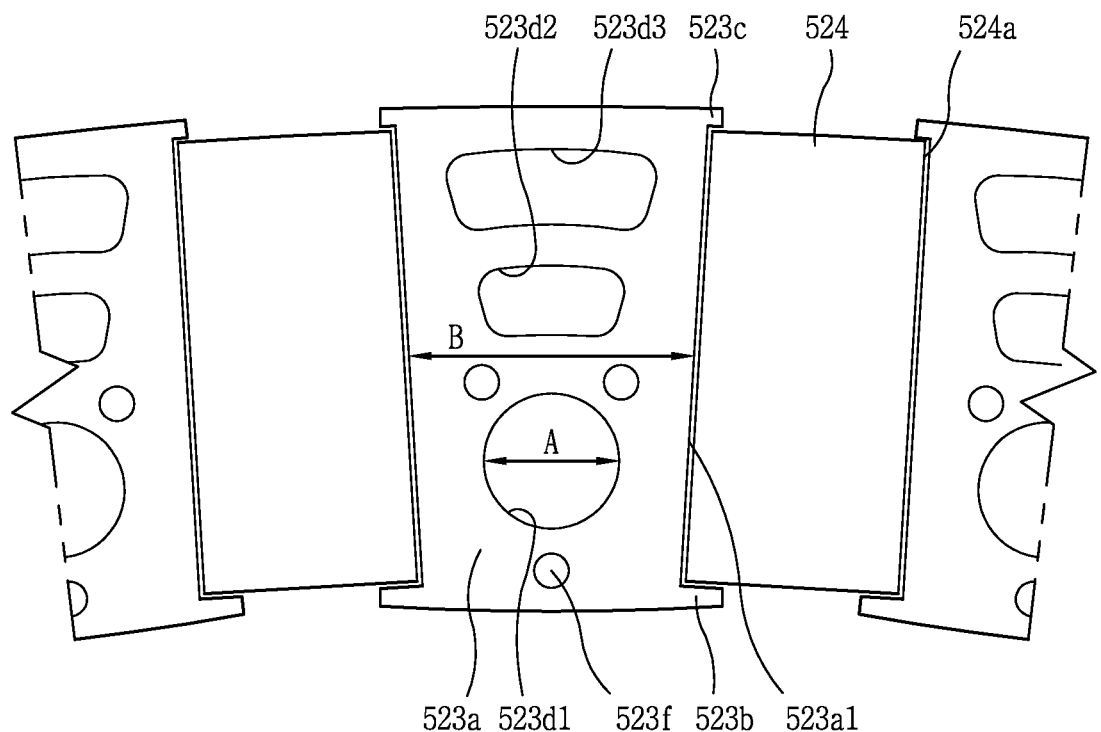
FIG. 9 is a plan view showing an example rotor core segment and an example permanent magnet.

FIG. 9 is a plan view showing an example rotor core segment 523 and an example permanent magnet 524.

The structure in which a distance between the two working surfaces 524a of the permanent magnets 524 gradually decreases toward an outer end of the permanent magnets 524 refers to the foregoing implementation. Similarly, the structure in which a linear distance (B) between both side surfaces of the body 523a of the rotor core segment 523 gradually increases toward an outer end of the rotor core segment 523 refers to the foregoing implementation.

The protrusion 523c of the rotor core segment 523 is protruded from an outer end of the body 523a to both sides thereof toward a circumferential direction of the rotor 120. As the protrusion 523c is protruded toward a circumferential direction of the rotor 120, the protrusion 523c may prevent the scattering of the permanent magnet 524. As the protrusions 523c prevent the scattering of the permanent magnets 524, the extent that a distance between the two working surfaces 524a of the permanent magnet 524 gradually decreases toward an outer end of the permanent magnet 524 does not have to be sharp. According to this structure, the volume of the permanent magnet 524 becomes larger, thereby further improving the performance of the motor 500.

In FIG. 9, the reference numerals 523b, 523d1, 523d2, and 523d3 may refer to a head, a first hole, a second hole, and a third hole, respectively.

The ratio (A/B) of the diameter (A) of each of the rotor core hole 223d1, 323d2, 423d, and 523d1 to the linear distance (B) between both side surfaces of each of the body 223a, 323a, 423a, 523a described in the foregoing implementations may be 0.4 to 0.7. For example, the ratio (A/B) of the diameter of the rotor core hole 223d1 and the linear distance between the both side surface of the body 223a may be 0.4 to 0.7.

The configurations and methods according to the above-described implementations will not be limited to the foregoing motor, and all or part of each implementation may be selectively combined and configured to make various modifications thereto.

The present disclosure, as described above, provides one or more examples of the position, size, shape, etc. of the rotor core hole, the rotor core slot, and the mac formed in the rotor core segment, which may improve the structural strength of the rotor without causing performance degradation or size increase of the motor. For example, the structural strength of the rotor may be secured though a structure in which the plurality of rotor core segments are separated from each other and a structure in which the plurality of permanent magnets are separated from each other, which may be advantageous from the viewpoint of the performance of the motor.

Furthermore, the present disclosure provides a structure capable of preventing the rotor core segment and the permanent magnet from scattering from each other. With this structure, the number of holes formed in the rotor frame may be minimized, thereby obtaining an effect of improving the structural strength of the rotor.

In addition, the present disclosure proposes a structure capable of stably positioning the rotor core segments and the permanent magnets in place and maintaining their positions in consideration of a shape that is injection-molded from the mold, thereby improving the manufacturability of the rotor, and securing the dimensional stability and reliability of the manufactured rotor.

What is claimed is:

1. A motor comprising:
   a stator; and
   a rotor rotatably coupled to a rotation shaft and disposed at an outer side of the stator,
   wherein the rotor comprises:
   a plurality of rotor core segments arranged along a circumferential direction of the rotor on the outer side of the stator and spaced apart from one another to define a plurality of permanent magnet arrangement slots between the plurality of rotor core segments, each of the plurality of rotor core segments defining a rotor core hole that extends parallel to an axial direction of the rotation shaft,
   a plurality of permanent magnets inserted into the plurality of permanent magnet arrangement slots, respectively, wherein the plurality of rotor core segments and the plurality of permanent magnets are alternately arranged along the circumferential direction of the rotor, and
   a rotor frame comprising a plurality of rotor frame pins that fix each of the plurality of permanent magnets between the plurality of rotor core segments, each of the plurality of rotor frame pins being inserted into the rotor core hole, wherein the rotor frame comprises:
   a base formed to surround the plurality of rotor core segments and the plurality of permanent magnets in a direction parallel to the axial direction of the rotation shaft; and
   a plurality of permanent magnet fixing jig holes formed only at an inner end of the base among the inner end of the base and an outer end of the base to expose the plurality of permanent magnets,
   wherein each of the plurality of rotor core segments comprises:
   a body that defines the rotor core hole,
   a head that protrudes from an inner end of the body to both sides along the circumferential direction of the rotor, and
   core protrusions that protrude radially outward from an outer end of the body and that are spaced apart from each other in the circumferential direction of the rotor to thereby define a rotor core slot between the core protrusions,
   wherein the rotor core hole is defined between the inner end of the body and the rotor core slot in a radial direction of the rotor,
   wherein each of the plurality of permanent magnets comprises:
   a first working surface that faces one of the plurality of rotor core segments in the circumferential direction of the rotor, and
   a second working surface that faces the one of the plurality of rotor core segments, that extends from the first working surface, and that defines an obtuse angle at a boundary between the first working surface and second working surface,
   wherein the body of the one of the plurality of rotor core segments comprises a first side surface that is in surface contact with the first working surface, and
   wherein each of the core protrusions of the one of the plurality of rotor core segments comprises a second side surface that extends from the first side surface of the body, that is in surface contact with the second working surface, and that defines an obtuse angle at a boundary between the first side surface and the second side surface.

2. The motor of claim 1, wherein a linear distance between the rotor core hole and the rotor core slot is greater than or equal to 0.45 mm in the radial direction of the rotor.

3. The motor of claim 1, wherein each of the plurality of rotor core segments comprises a plurality of electrical sheets that are stacked,
   wherein each of the plurality of electrical sheets comprises a mating part that is disposed around the rotor core hole, that protrudes from a first surface of one of the electric sheets, and that is recessed from a second surface of the one of the electric sheets, and
   wherein a linear distance between the rotor core hole and the mating part is greater than or equal to 0.45 mm.

4. The motor of claim 1, wherein a linear distance between both side surfaces of the body increases toward an outer side of one of the plurality of rotor core segments,
   wherein a linear distance between both side surfaces of the core protrusions increases toward the outer side of the one of the plurality of rotor core segments, and
   wherein a rate of increase of the linear distance between the both side surfaces of the core protrusions is greater than a rate of increase of the linear distance between the both side surfaces of the body.

5. The motor of claim 1, wherein the obtuse angle defined at the boundary between the first side surface and the second side surface is 190 to 230 degrees.

6. The motor of claim 1, wherein a radial length of the second working surface in the radial direction of the rotor is defined by a difference between a radial length of one of the plurality of permanent magnets and a radial length of the first working surface, and
   wherein a ratio of the radial length of the second working surface with respect to the radial length of the one of the plurality of permanent magnets is 0.15 to 0.35.

7. The motor of claim 1, wherein each of the plurality of rotor core segments has a first end and a second end positioned opposite to each other in the axial direction of the rotation shaft,
   wherein each of the plurality of permanent magnets has a first end and a second end positioned opposite to each other in the axial direction of the rotation shaft,
   wherein the rotor frame comprises:

a first end base that surrounds the first ends of the plurality of rotor core segments and the first ends of the plurality of permanent magnets; and a second end base that surrounds the second ends of the plurality of rotor core segments and the second ends of the plurality of permanent magnets, and wherein a length of each of the plurality of rotor frame pins in the axial direction of the rotation shaft is less than a distance between the first end base and the second end base.

8. The motor of claim 1, wherein each of the plurality of rotor core segments has a first end and a second end positioned opposite to each other in the axial direction of the rotation shaft, wherein each of the plurality of permanent magnets has a first end and a second end positioned opposite to each other in the axial direction of the rotation shaft, wherein the base comprises:
a first end base that surrounds the first ends of the plurality of rotor core segments and the first ends of the plurality of permanent magnets; and a second end base that surrounds the second ends of the plurality of rotor core segments and the second ends of the plurality of permanent magnets, wherein one of the first end base or the second end base defines the plurality of permanent magnet fixing jig holes at an inner end of the one of the first end base or the second end base, wherein the plurality of permanent magnet fixing jig holes expose the plurality of permanent magnets to an outside of the rotor frame, and wherein the plurality of permanent magnet fixing jig holes are formed only at an inner end between the inner and outer ends of the first end base or the second end base.

9. The motor of claim 8, wherein the rotor frame has a plurality of inner pillars extended in a direction parallel to the axial direction of the rotation shaft to connect an inner end of the first end base and an inner end of the second end base to each other, and the plurality of permanent magnet fixing jig holes are formed for each boundary between the first end base and the plurality of inner pillars or formed for each boundary between the second end base and the plurality of inner pillars.

10. The motor of claim 8, wherein the plurality of permanent magnet fixing jig holes are spaced from one another and arranged along a circumferential direction of the rotor frame.

11. The motor of claim 1, wherein each of the plurality of rotor core segments has a first end and a second end positioned opposite to each other in the axial direction of the rotation shaft, wherein each of the plurality of permanent magnets has a first end and a second end positioned opposite to each other in the axial direction of the rotation shaft, wherein the rotor frame comprises:
a first end base that surrounds the first ends of the plurality of rotor core segments and the first ends of the plurality of permanent magnets; and a second end base that surrounds the second ends of the plurality of rotor core segments and the second ends of the plurality of permanent magnets, and wherein one of the first end base or the second end base defines a plurality of rotor frame holes, each of the plurality of rotor frame holes facing one of the plurality of rotor frame pins in the axial direction of the rotation shaft.

12. The motor of claim 1, wherein each of the plurality of permanent magnets comprises:
an inner surface that faces the stator; and
an outer surface that faces an opposite side of the inner surface, and wherein a ratio of a width of the outer surface in the circumferential direction of the rotor with respect to a width of the inner surface in the circumferential direction of the rotor is 0.6 to 0.8.

13. The motor of claim 1, wherein a linear distance between both side surfaces of each of the plurality of rotor core segments increases toward an outer end of the corresponding rotor core segment, and wherein the both side surfaces of each of the plurality of rotor core segments have shapes symmetrical to each other with respect to the radial direction of the rotor.

14. The motor of claim 1, wherein a ratio of a diameter of the rotor core hole with respect to a linear distance between both side surfaces of each of the plurality of rotor core segments is 0.4 to 0.7.

* * * * *